United States Patent
Reichman et al.

(10) Patent No.: US 11,531,662 B2
(45) Date of Patent: *Dec. 20, 2022

(54) SYSTEM AND METHOD FOR USE OF A DYNAMIC FLOW IN A MULTIDIMENSIONAL DATABASE ENVIRONMENT

(71) Applicant: ORACLE INTERNATIONAL CORPORATION, Redwood Shores, CA (US)

(72) Inventors: Natasha Reichman, Beer Sheva (IL); Sergei Riaboi, Arad (IL); Alexey Roytman, Beer Sheva (IL); Victor Belyaev, San Jose, CA (US); Kumar Ramaiyer, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 61 days.

This patent is subject to a terminal disclaimer.

(21) Appl. No.: 16/735,448

(22) Filed: Jan. 6, 2020

(65) Prior Publication Data

US 2020/0142872 A1 May 7, 2020

Related U.S. Application Data

(63) Continuation of application No. 15/332,948, filed on Oct. 24, 2016, now Pat. No. 10,552,393.
(Continued)

(51) Int. Cl.
| | |
|---|---|
| G06F 7/00 | (2006.01) |
| G06F 16/00 | (2019.01) |
| G06F 16/22 | (2019.01) |
| G06F 16/28 | (2019.01) |
| G06F 16/2455 | (2019.01) |

(52) U.S. Cl.
CPC ........ G06F 16/22 (2019.01); G06F 16/24562 (2019.01); G06F 16/283 (2019.01)

(58) Field of Classification Search
None
See application file for complete search history.

(56) References Cited

U.S. PATENT DOCUMENTS

| | | |
|---|---|---|
| 5,574,952 A | 11/1996 | Brady |
| 5,915,129 A | 6/1999 | Slivka |
| (Continued) | | |

OTHER PUBLICATIONS

Zumbrum, Sarah Craynon, "How Exactly Does Essbase Work? Part 1", RealTriGeek Oracle Analytics, Essbase, OCI, and Triathlons, Jul. 22, 2014, 9 pages. <https://realtrigeek.com/2014/07/22/how-exactly-does-essbase-work-part-i/>.
(Continued)

*Primary Examiner* — Tuan A Pham
(74) *Attorney, Agent, or Firm* — Tucker Ellis LLP

(57) ABSTRACT

In accordance with an embodiment, described herein is a system and method for use of a dynamic flow process (referred to herein in some examples as Query Processing Dynamic Flow (QPDF)) in a multidimensional database computing environment. The dynamic flow process enables hybrid use of, for example, aggregate storage option, block storage option, or other types of storage containers, and provides a common flow to process a received input query in bottom-up mode. The approach can be used to reduce the size of the cube, which provides for efficient calculation of dynamic members.

20 Claims, 6 Drawing Sheets

Related U.S. Application Data

(60) Provisional application No. 62/245,892, filed on Oct. 23, 2015, provisional application No. 62/245,897, filed on Oct. 23, 2015, provisional application No. 62/245,901, filed on Oct. 23, 2015, provisional application No. 62/411,473, filed on Oct. 21, 2016.

(56) References Cited

U.S. PATENT DOCUMENTS

| | | | |
|---|---|---|---|
| 6,161,105 | A | 12/2000 | Keighan |
| 6,574,720 | B1 | 6/2003 | Hopeman |
| 6,629,102 | B1 | 9/2003 | Malloy |
| 6,766,325 | B1 | 7/2004 | Pasumansky |
| 6,873,994 | B2 | 3/2005 | Kootale |
| 7,133,876 | B2 | 11/2006 | Roussopoulos |
| 7,392,242 | B1* | 6/2008 | Baccash ............ G06F 16/24539 |
| 8,037,086 | B1 | 10/2011 | Upstill |
| 8,156,083 | B2 | 4/2012 | Banerjee |
| 8,386,296 | B2 | 2/2013 | Hage |
| 9,081,830 | B1 | 7/2015 | Stolte |
| 10,083,195 | B2 | 9/2018 | Zhou |
| 10,318,498 | B2 | 6/2019 | Tran |
| 10,346,435 | B2 | 7/2019 | Walker |
| 10,360,527 | B2 | 7/2019 | Abe |
| 10,467,251 | B2 | 11/2019 | Menon |
| 2002/0029207 | A1 | 3/2002 | Bakalash |
| 2003/0005420 | A1 | 1/2003 | Ghosh |
| 2004/0054858 | A1 | 3/2004 | Chandrasekaran |
| 2005/0262108 | A1 | 11/2005 | Gupta |
| 2006/0010159 | A1 | 1/2006 | Mirchandani |
| 2006/0085742 | A1* | 4/2006 | Harold .................. G06F 16/283 715/249 |
| 2006/0106769 | A1 | 5/2006 | Gibbs |
| 2006/0271568 | A1 | 11/2006 | Balkir |
| 2007/0027674 | A1 | 2/2007 | Parson |
| 2007/0061344 | A1 | 3/2007 | Dickerman |
| 2007/0088691 | A1 | 4/2007 | Dickerman |
| 2007/0094668 | A1 | 4/2007 | Jacquot |
| 2008/0288524 | A1 | 11/2008 | Dumitru |
| 2009/0030915 | A1* | 1/2009 | Winter .................. G06F 16/283 |
| 2009/0248651 | A1 | 10/2009 | Perry |
| 2009/0249125 | A1 | 10/2009 | Bhatawdekar |
| 2009/0276705 | A1 | 11/2009 | Ozdemir |
| 2014/0046920 | A1 | 2/2014 | Shuma |
| 2014/0122413 | A1 | 5/2014 | Presti |
| 2017/0116032 | A1 | 4/2017 | Tran |
| 2017/0116215 | A1 | 4/2017 | Ramaiyer |
| 2017/0116281 | A1 | 4/2017 | Roytman |
| 2017/0116290 | A1 | 4/2017 | Reichman |
| 2017/0116308 | A1 | 4/2017 | Alberg |
| 2017/0116309 | A1 | 4/2017 | Menon |
| 2017/0116310 | A1 | 4/2017 | Walker |
| 2017/0116311 | A1 | 4/2017 | Reichman |
| 2017/0116312 | A1 | 4/2017 | Reichman |
| 2017/0116313 | A1 | 4/2017 | Roytman |
| 2019/0073366 | A1 | 3/2019 | Raimaiyer |
| 2019/0079959 | A1 | 3/2019 | Raimaiyer |
| 2019/0102445 | A1 | 4/2019 | Raimaiyer |
| 2019/0102446 | A1 | 4/2019 | Raimaiyer |
| 2019/0102447 | A1 | 4/2019 | Raimaiyer |
| 2019/0258612 | A1 | 8/2019 | Tran |
| 2019/0286638 | A1 | 9/2019 | Walker |

OTHER PUBLICATIONS

Crisan, Dan, "Intro to Database Systems : Indexing Part 2—B+ trees", blog Apr. 4, 2015, 8 pages. <http://blog.dancrisan.com/intro-to-database-systems-indexing-part-2-b-trees>.

Iankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

Russakovsky, Alexander; "Hopping over Big Data: Accelerating Ad-hoc OLAP Queries with Grasshopper Algorithms" published Feb. 26, 2015, 30 pages.

"Dynamic Flow process" definition Nov. 26, 2018, google.com, hllps://www.google.com/search?biw=1920&bih=1076&ei=njv8W_CJD4mizwK_I4gCQ&q=%22dynamic+flow+process%22+definition&oq=%22dynamic•flow+process%22+definition&gs I=psy-ab . 3 . . . 38876 .39886 . . . 40199 . . . 0 .0 . . . 0. 76.437 .8 . . .0 . . . 1 . . . gws-.viz . . . Oi71 j0i7i30j0i30j0i8i30.

"Dynamic Flow process" OLAP Nov. 26, 2018, google.com, https://www.google.com/search?biw=1920&bih=1076&ei=njv8W_CJD4mizwK_I4gCQ&q=%22dynamic+flow+process%22+definition&oq=%22dynamic •flow+process%22+definition&gs I=psy-ab . 3 . . . 38876 .39886 . . . 40199 . . . 0 .0 . . . 0. 76.437 .8 . . . 0 . . . 1 . . . gws-.viz . . . Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

Unknown Author, DBMS Indexing, 5 pages, retrieved Feb. 20, 2020 from: <https://www.tutorialspoint.com/dbms/dbms_indexing.htm>.

United States Patent and Trademark Office, Office Action dated Jun. 11, 2021 for U.S. Appl. No. 15/333,022, 10 pages.

Oracle, Oracle® Business Intelligence Cloud Service Data Sync, Getting Started, Release 2.2, Sep. 2016, Copyright © 2010, 2016, 6 pages.

Oracle, Oracle® Business Intelligence Cloud Service Data Sync, Read Me, Release 2.2, Sep. 2016, Copyright © 2016, 6 pages.

Harvey, Rosie et al., Oracle® Cloud, Preparing Data in Oracle Business Intelligence Cloud Service, E64760-07, Feb. 2017, Copyright © 2014, 2017, 282 pages.

Williams, Richard "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

United States Patent and Trademark Office, Office Action dated Nov. 23, 2021 for U.S. Appl. No. 15/333,022, 15 pages.

* cited by examiner

SYSTEM AND METHOD FOR USE OF A DYNAMIC FLOW IN A MULTIDIMENSIONAL DATABASE ENVIRONMENT

CLAIM OF PRIORITY

This application is a continuation of and claims the benefit of priority to U.S. Patent Application entitled "SYSTEM AND METHOD FOR USE OF A DYNAMIC FLOW IN A MULTIDIMENSIONAL DATABASE ENVIRONMENT", application Ser. No. 15/332,948, filed on Oct. 24, 2016, which application claims the benefit of priority to U.S. Provisional Application titled "SYSTEM AND METHOD FOR HYBRID SUPPORT FOR DYNAMIC UPPER LEVEL MEMBERS WITH A MULTIDIMENSIONAL DATABASE", Application No. 62/245,892, filed Oct. 23, 2015, U.S. Provisional Application titled "SYSTEM AND METHOD FOR HIGH PERFORMANCE BOTTOM-UP AGGREGATION IN A MULTIDIMENSIONAL DATABASE ENVIRONMENT", Application No. 62/245,897, filed Oct. 23, 2015, U.S. Provisional Application titled "SYSTEM AND METHOD FOR SUPPORT FOR LARGE QUERIES IN A MULTIDIMENSIONAL DATABASE ENVIRONMENT", Application No. 62/245,901, filed Oct. 23, 2015, and U.S. Provisional Application titled "SYSTEM AND METHOD FOR PROVIDING A MULTIDIMENSIONAL DATABASE", Application No. 62/411,473, filed Oct. 21, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to multidimensional database computing environments, and are particularly related to a system and method for use of a dynamic flow in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is a system and method for use of a dynamic flow (referred to herein in some examples as Query Processing Dynamic Flow (QPDF)) in a multidimensional database (e.g., Essbase) computing environment. The dynamic flow process enables hybrid use of, for example, Aggregate Storage Option (ASO), Block Storage Option (BSO), or other types of storage containers, and provides a common flow to process a received input query in bottom-up mode. The approach can be used to reduce the size of the cube, which provides for efficient calculation of dynamic members.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
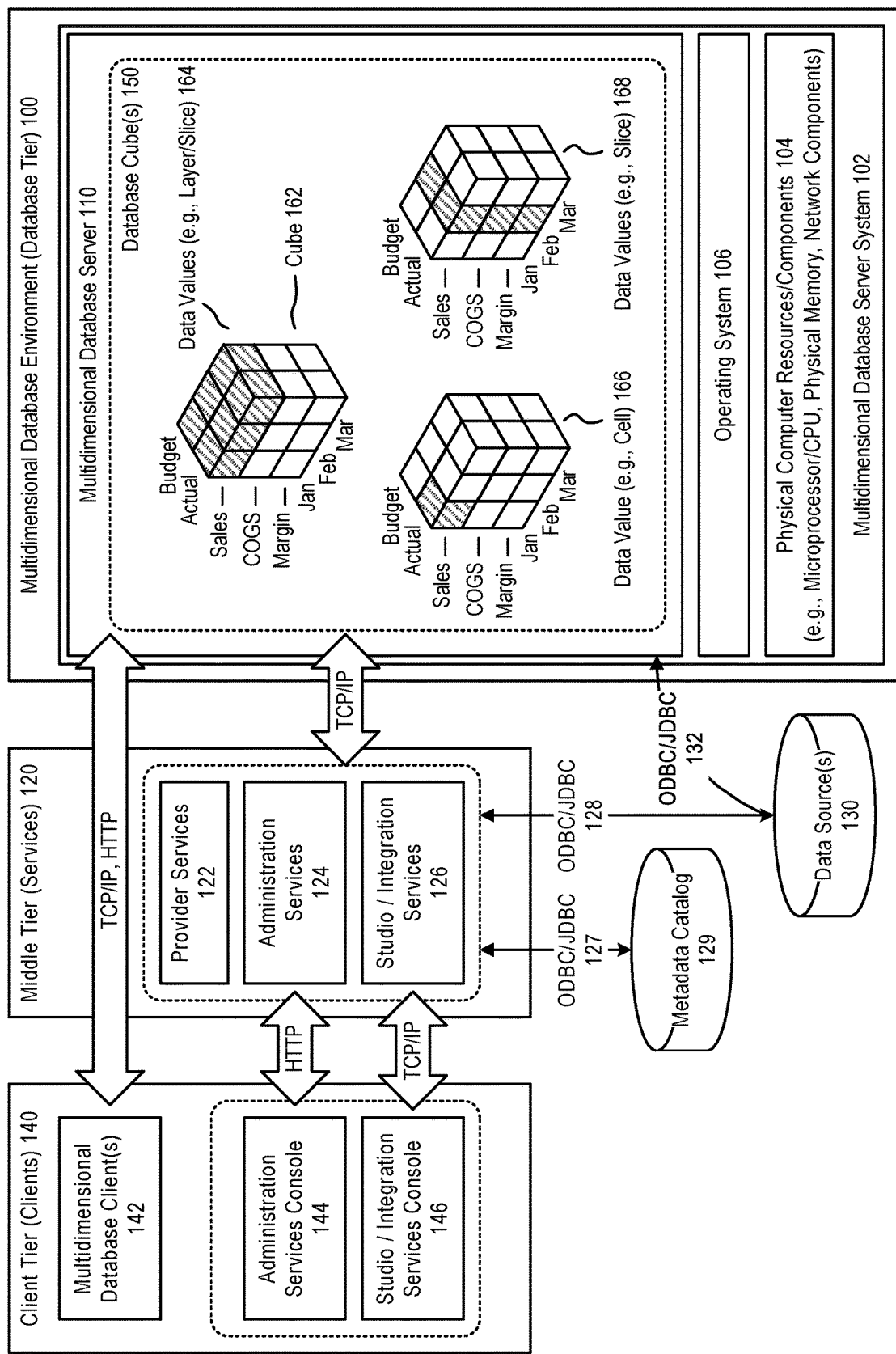
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Dynamic Flow

In accordance with an embodiment, the system supports the use of a dynamic flow (referred to herein in some examples as Query Processing Dynamic Flow (QPDF)) in a multidimensional database (e.g., Essbase) computing environment. The dynamic flow process enables hybrid use of, for example, Aggregate Storage Option (ASO), Block Storage Option (BSO), or other types of storage containers, and provides a common flow to process a received input query in bottom-up mode. The approach can be used to reduce the size of the cube, which provides for efficient calculation of dynamic members.

For example, in accordance with an embodiment, for queries accessing dynamic sparse members, the system can use an aggregate storage engine to satisfy the request. For queries that cannot be processed by the aggregate storage engine, the system can employ a block storage engine to satisfy the request, including for example bringing the data into an aggregate storage temporary tablespace.

For example, in accordance with an embodiment, when executed by a computer system, the dynamic flow process can operate upon a multidimensional database to: (1) expand an input query to find all base/calculated data; (2) analyze the expanded query to find dependencies and an order of calculation; (3) define calculation units according to the preceding steps; (4) build a processing flow with the defined calculation units, and connect them; and (5) execute the processing flow, and determine a response to the input query.

Figure 2:
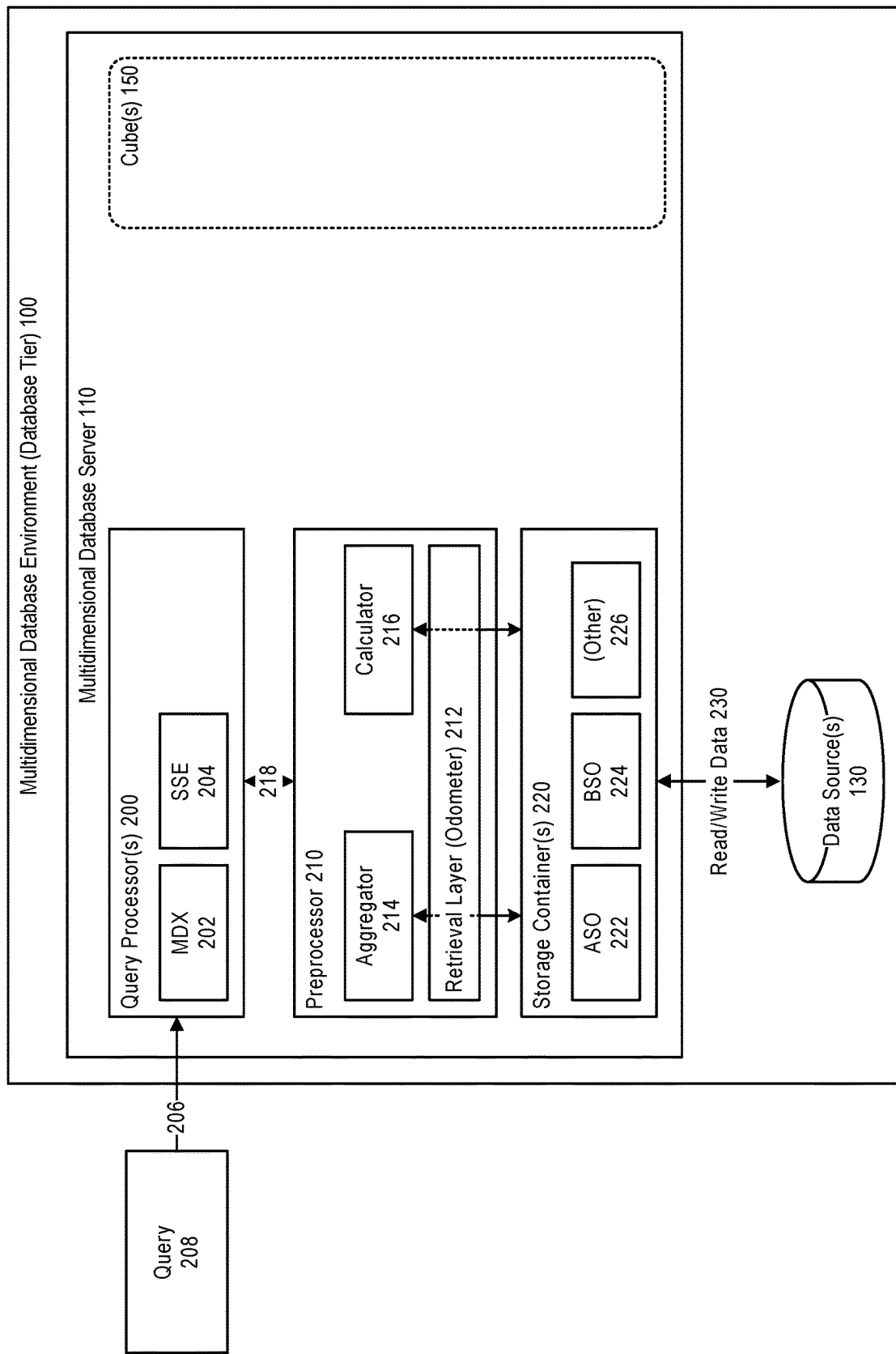
FIG. 2 illustrates use of a dynamic flow with a multidimensional database, in accordance with an embodiment.

FIG. 2 illustrates use of a dynamic flow with a multidimensional database, in accordance with an embodiment.

In a typical multidimensional environment, in order to prepare the system to respond to input queries, the database server pre-calculates values for certain dimensions, and stores those pre-calculated values in the cube for later lookup.

In accordance with an embodiment, when a dynamic flow is instead used, the ability to support dynamic query processing enables the database server to avoid pre-calculating and storing such values, which improves performance and reduces the storage of potentially empty cells.

As illustrated in FIG. 2, in accordance with an embodiment, the system can include one or more query processor(s) 200, for example a Multidimensional Expressions (MDX) query processor 202, and/or a SpreadSheet Extractor (SSE) 204 query processor, that enable receipt 206 of an input query 208 from a client, to retrieve, access, or otherwise examine a set of data from a data source, as provided by and made accessible via the multidimensional database.

In accordance with an embodiment, a preprocessor component 210 can include a data retrieval layer 212 or data fetching component (which in some environments can incorporate a kernel-based odometer retriever, or odometer or data structure stored in memory that manages pointers to data blocks, contains control information, or otherwise acts as an array of arrays of pointers to stored members), an aggregator component 214, and a calculator component 216, each of these layers and components can be provided as a software or program code that is executable by a computer system.

Generally, described, in accordance with an embodiment, the preprocessor receives 218 input queries, from the one or more query processor(s), for processing against the multidimensional database. The aggregator is adapted to perform hierarchical aggregations of the data. The calculator is adapted to perform calculations on the data, and to cooperate with the aggregator, as further described below, to utilize the data retrieval layer (including an odometer as appropriate) to at least one of populate and/or search within a cube, and to process a response to an input query.

In accordance with an embodiment, the system can include one or more storage container(s) 220, such as, for example, one or more of an Aggregate Storage Option (ASO) 222, Block Storage Option (BSO) 224, or other type of storage container 226, each of which storage containers can act as an interface between the data that is read from/written to 230 the data source or multidimensional database, and whichever data might be needed for aggregation and calculation at the preprocessor.

Figure 3:
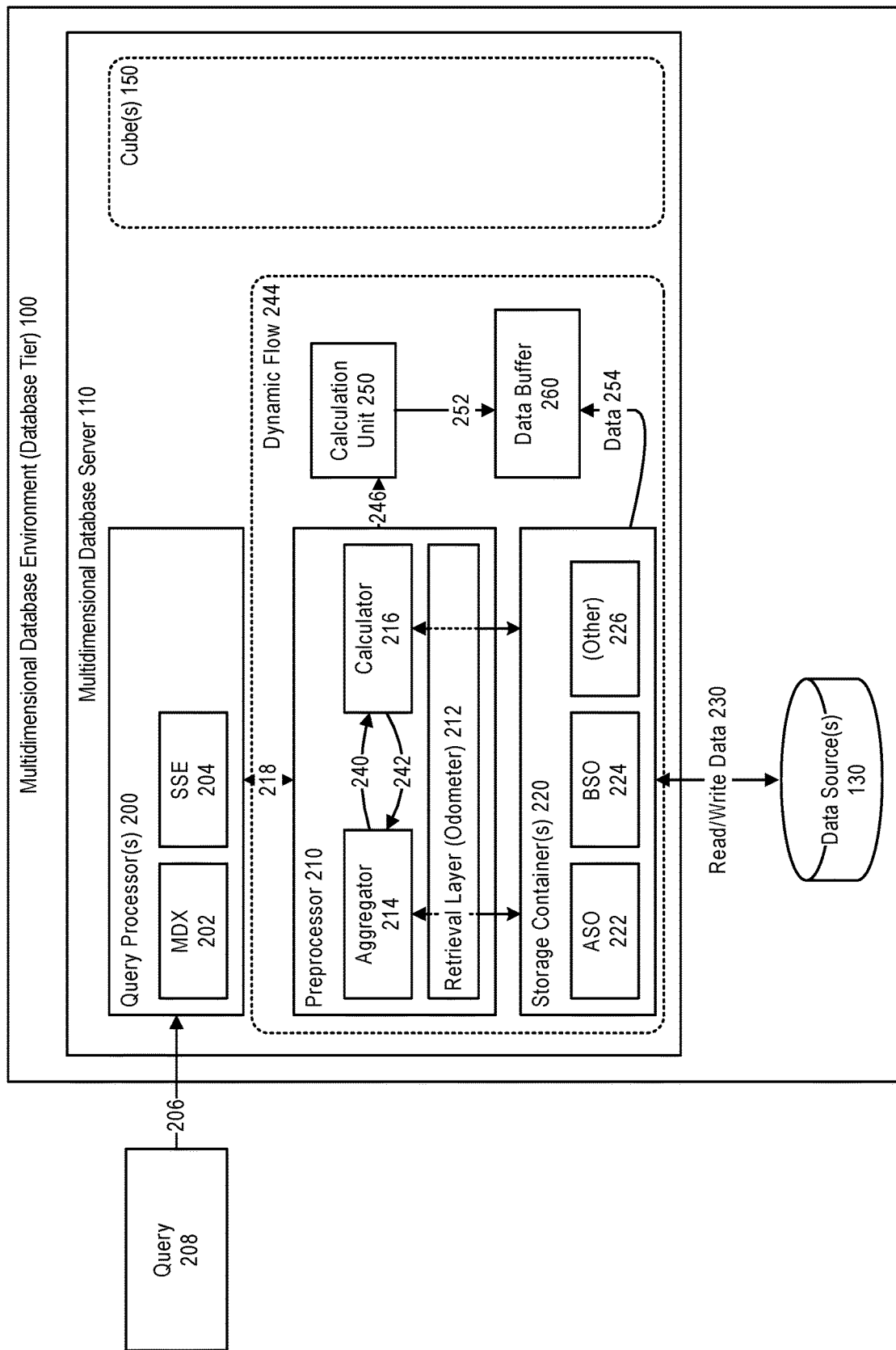
FIG. 3 further illustrates use of a dynamic flow with a multidimensional database, in accordance with an embodiment.

FIG. 3 further illustrates use of a dynamic flow with a multidimensional database, in accordance with an embodiment.

As illustrated in FIG. 3, in accordance with an embodiment, in response to the database server receiving an input query, the aggregator can operate 240, 242 in combination with the calculator, to process the query, as part of a dynamic flow 244, which can be similarly provided as software or program code that is executable by a computer system.

For example, as illustrated in FIG. 3, the dynamic flow process enables hybrid use of, in this example, one or more ASO, BSO, or other types of storage containers, and provides a common flow to process the query using these storage containers, in a bottom-up mode.

In accordance with an embodiment, when the system begins to process an input query, it first determines, from an examination of the input query, which particular data or other information needs to be retrieved, i.e., a metadata. The system can then define 246 for that input query, an initial calculation unit 250, which encapsulates an aggregation/calculation process that will retrieve a set of data from the storage container(s).

In accordance with an embodiment, a data buffer 260 (referred to herein, in some examples, as one or more output buckets) operates as a data structure into which each calculation unit can read/write data 252, and which allows for a temporary storage of the data received from 254 the storage container(s), for consumption by calculation unit(s).

In accordance with an embodiment, when the dynamic flow is used with a BSO-type storage container, the dynamic flow process performs a pre-analysis of an input query, and an expansion of asked points to its base data.

However, the amount of such expanded base data may be quite large.

To address this, and to reduce the volume of expanded data, in accordance with an embodiment, a first dynamic aggregation can be performed during the fetching of data from the kernel, without a full expansion of the associated kernel structure (such as, for example, a kernel-side odometer as described above).

In accordance with an embodiment, the dynamic flow then operates to expand the input query, to find all base/calculated data; and to analyze the expanded query to find dependencies and an order of calculation.

Figure 4:
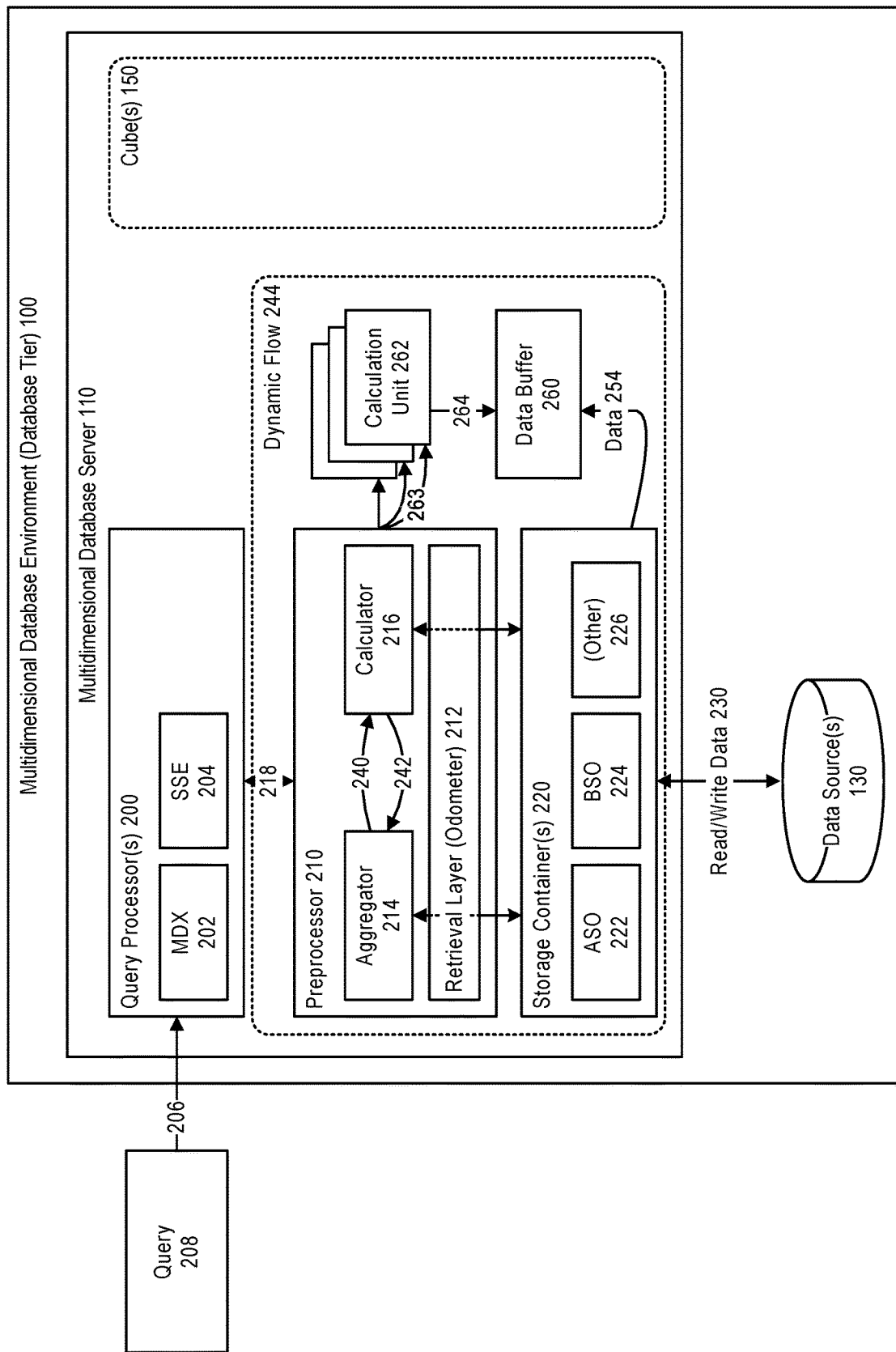
FIG. 4 further illustrates use of a dynamic flow with a multidimensional database, in accordance with an embodiment.

FIG. 4 further illustrates use of a dynamic flow with a multidimensional database, in accordance with an embodiment.

As illustrated in FIG. 4, in accordance with an embodiment, as each subsequent calculation unit 262 is determined by the system as part of a dynamic flow instance, the aggregation/calculation process encapsulated by that calculation unit fills up 263 another output bucket in the data buffer.

In accordance with an embodiment, the dynamic flow process continues defining subsequent calculation units; and then connects the calculation units; and executes the resultant processing flow, to determine a response to the input query.

Figure 5:
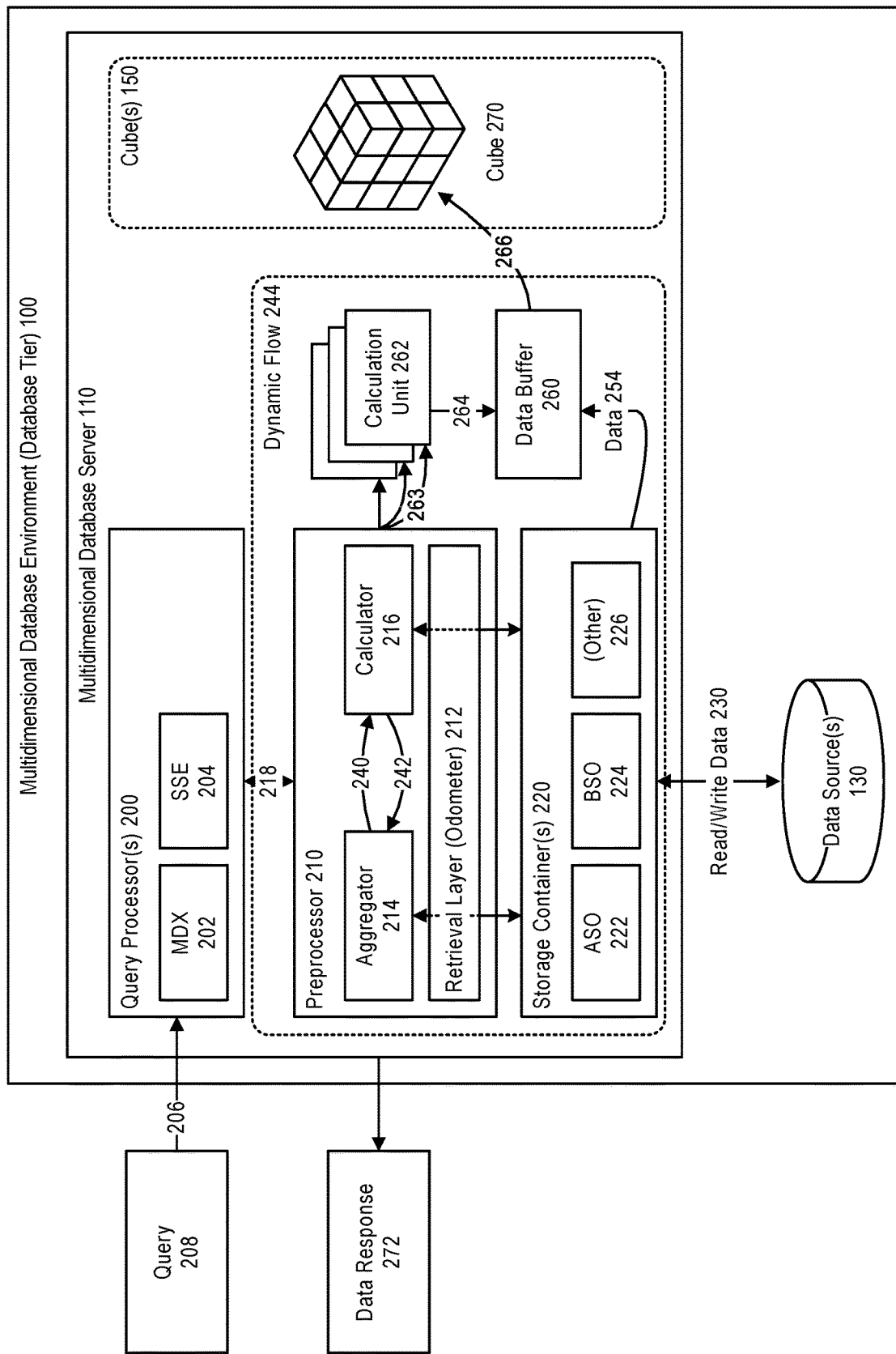
FIG. 5 further illustrates use of a dynamic flow with a multidimensional database, in accordance with an embodiment.

FIG. 5 further illustrates use of a dynamic flow with a multidimensional database, in accordance with an embodiment.

As illustrated in FIG. 5, in accordance with an embodiment, once the dynamic flow has been built, and has been processed to completion of a response, the preprocessor can create or otherwise populate 266 a database cube 270, and the data response 272 can be returned to the requesting client.

In accordance with an embodiment, the dynamic flow can support a variety of modes: including streaming and non-streaming modes, as further described below.

In accordance with an embodiment, in a streaming mode, each calculation unit includes two steps of execution, including that (a) each stored cell is processed according to a calculation unit logic (if it belongs to the unit) and the cell is returned to subsequent/next units and/or an output bucket, without a need for temporary storage; and (b) all calculated dynamic cells are then returned to next units and/or the output bucket.

Advantages of the streaming mode include the provision of a streaming interface; and efficient data processing (for example, there is no need for temporary storage of unused cells, the mode requires low memory usage, and each cell will be processed only in relevant units).

In accordance with an embodiment, in a non-streaming mode, each calculation unit stores all of its cells in a local temporary buffer, until all of the calculations are finished. Once all of the calculations are finished, then all calculated points are returned to the next unit, one-by-one (as in the streaming mode).

Advantages of the non-streaming mode include a simpler logic for the calculation units and their interactions.

Figure 6:
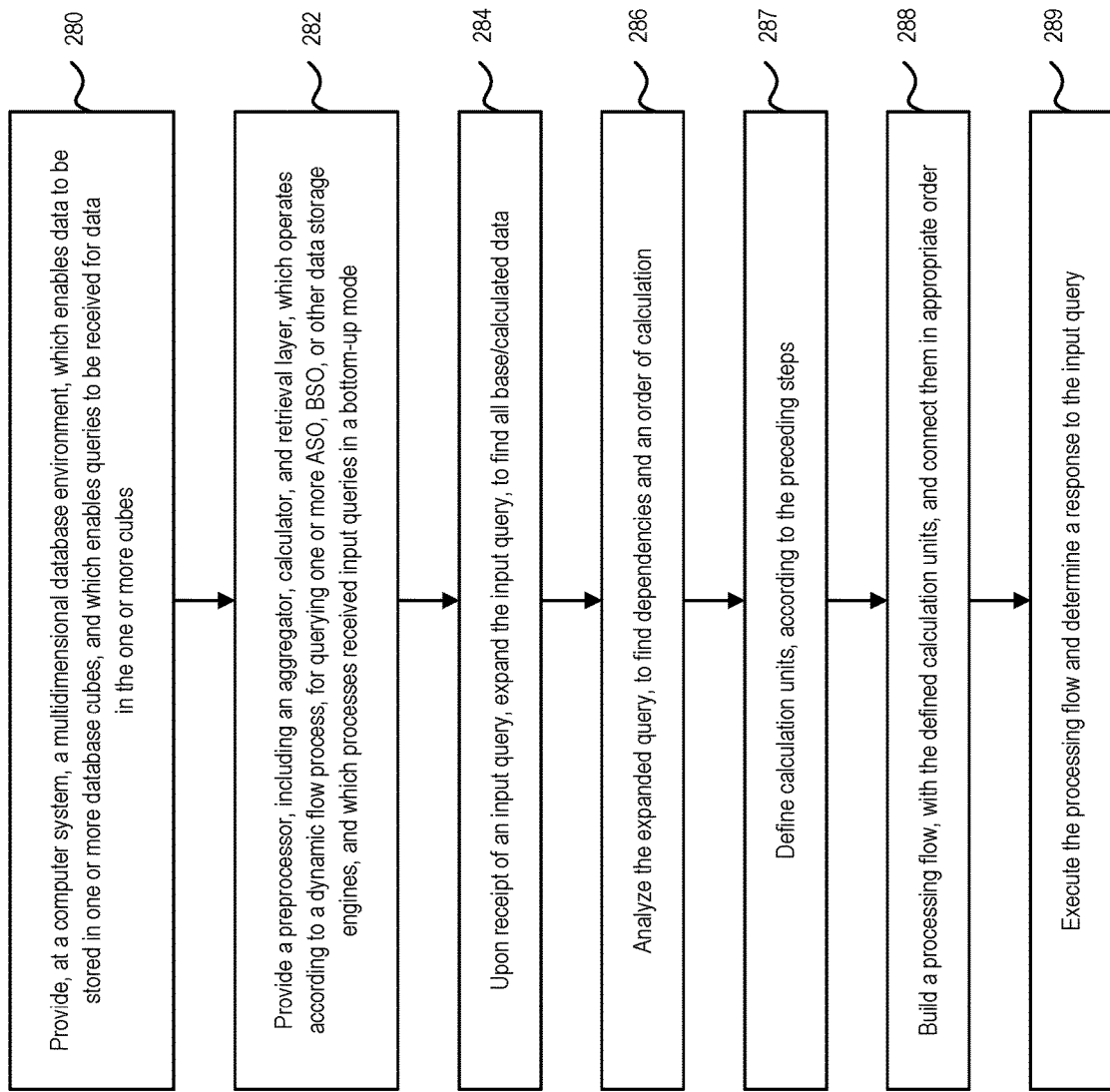
FIG. 6 illustrates a process for use of a dynamic flow with a multidimensional database, in accordance with an embodiment.

FIG. 6 illustrates a process for use of a dynamic flow with a multidimensional database, in accordance with an embodiment.

As illustrated in FIG. 6, in accordance with an embodiment, at step 280, a multidimensional database environment is provided at a computer system, which enables data to be stored in one or more database cubes, and which enables queries to be received for data in the one or more cubes.

At step 282, a preprocessor, including an aggregator, calculator, and retrieval layer is provided, which operates according to a dynamic flow process, for querying one or more ASO, BSO, or other data storage engines, and which processes received input queries in a bottom-up mode.

At step 284, upon receipt of an input query, the input query is expanded, to find all base/calculated data.

At step 286, the expanded query is analyzed, to find dependencies and an order of calculation.

At step 287, calculation units are defined, according to the preceding steps.

At step 288, a processing flow is built, with the defined calculation units and connecting them in appropriate order.

At step 289, the processing flow is executed, and a response to the input query is determined.

Example Embodiment

In accordance with an example embodiment, the system can include or operate according to various functionality or functions described below. In accordance with other embodiments, other types of functionality or functions can be included.

In accordance with an example embodiment, QPDF provides a common flow for querying both ASO and BSO engines, including running queries in bottom-up mode. In accordance with an embodiment, in order to process a query in bottom-up mode, the system can perform the steps of:

1. Expand input query (find all based/calculated data).
2. Analyze expanded query (find dependencies and order of calculation).
3. Define calculation steps (divide into calculation units according to steps 1 and 2).
4. Build the flow (build defined calculation units and connect them).
5. Execute the flow and output the answer.

QPDF Modes

In accordance with an example embodiment, in a streaming mode, each unit has two steps of execution, including: 1. Process each stored cell according to unit logic (if it belongs to the unit) and return this cell to next units and/or output bucket without need of temporary storage. 2. After prefix cmi changes, all calculated dynamic cells will be returned to next units and/or output bucket.

Advantages of the streaming mode include: provision of streaming interface; and optimal data processing (no need for temporary storage of unused cells, low memory usage, each cell will be processed only in relevant units).

In accordance with an example embodiment, in a non-streaming mode, each unit stores all cells in local temporary buffer until all calculations are finished. Then all calculated points are returned to the next unit one by one (exactly as in streaming mode). Advantages of this mode include simpler logic of QPDF units and their interaction.

DynamicFlow

In accordance with an example embodiment, a Dynamic Flow object is responsible for running the calculation in bottom-up mode. This object calculates given odometer (symmetric); and has a streaming interface (getNext(coordinates[ ], value*)). The responsibility of Dynamic Flow is to: Initialize common parameters, allocate memory for objects; Analyze odometer, dependencies; build and initialize QPDF units, build execution plan; and run getNext of last unit unless get "finished" return status.

In accordance with an embodiment, Dynamic Flow parameters can include:

AD_THDCTX_T*tctxp—pointer to thread context, received in constructor.

MTDHMember**odometer—input odometer, received in constructor.

MEMNUM*sizearray—sizes of dimensions in input odometer, received in constructor.

AD_QXAXESINFO_T*axeslnfo—received in constructor.

AD_UKRTUPLEBUFFER_T*outBufer—received in constructor.

AD_UKRTUPLEBUFFER_T*statusesBuffer—received in constructor.

QPDFBaseUnit*lastUnit—pointer to the last unit in the chain.

MTDHMember**expandedOdometer.

MEMNUM*expandedsizearray.

AD_STS_T init( )

In accordance with an example embodiment, this function prepares all needed steps before a first call to getNext: Expands, sorts odometer; Analyses odometer; Creates and initializes OutputBucket; Builds units.

AD_STS_T getNext(CoordType*coordinates, double* value)

AD_STS_T status=lastUnit→getNext(coordinates, value)

In accordance with an example embodiment, a call to the getNext of last built unit will trigger the calculation of the odometer. The result will be outputted to outputBuffer, so after the call to lastUnit→getNext finishes, the system is ready to return the answer.

AD_STS_T expandOdometerASO

In accordance with an example embodiment, this function is a wrapper to adQxUkrExpandMeasures(tctxp, retrCtx). After calling to this function the system will have an expanded, sorted odometer with built weights.

AD_STS_T expandOdometerBSO

In accordance with an example embodiment, this function is a wrapper to qxGridExpand. After calling to this function, the system will have an expanded, sorted odometer with built weights.

buildUnits

In accordance with an example embodiment, this function builds chain of CalculationUnits.

For ASO flow:
  Use adQxUkrGenPassExecPlan for analyzing
  Create OdometerRetriever for aggregatedMembers
  For each path in created Plan
  Create Calculator with appropriate AD_QXUKRPASSEXECPLAN_T structure For BSO flow:
  Create OdometerRetriever for only stored members
  For all dynamically calculated members
  For each SolveOrder
    For each dimension
      Call to identifyUnits function In accordance with an example embodiment, Aggregators may be always merged; Calculators may be merged if merged FormulaCache size does not exceed the maximum.

identifyUnits

In accordance with an example embodiment, this function will define units for calculating single dimension.

```
Struct {
Int    unitType;
CoordRangeSet membersToCalculate
}UnitDefinition
```

The above can be used for declare single unit. The calculation chain will be defined by vector of such structures, the chain can be created according to the following algorithm: Identify members for Calculation and for Aggregation; Identify QPDFBaseUnits for each dimension according to the following process: All aggregated following members may be aggregated by single Aggregator; Calculated members may be calculated by single calculator if FormulaCache does not exceed its bounds.

defineDimOrders

In accordance with an example embodiment, a structure DimOrderinformation can be filled during buildUnits for each enumerated BaseUnit. This structure will mention if this Unit is sensitive to order of input dimensions (for example, for Aggregator it is false) and as well as the needed order of input dimensions.

```
struct
{
DIMNUM *dimOrders;
Boolean orderSensitive
}DimOrderInformation
```

In accordance with an example embodiment, after a first pass of building these structures for each BaseUnit, go in reverse order (from the last enumerated unit) and try to evaluate orders of different units one to another according to the following process:

1. If the unit is not order sensitive—go to the next one.
2. If the unit has certain dimOrder, check the previous unit.
3. For non-order sensitive—change it to the required.
4. For sensitive order, in case it is different from current—insert Reorder unit to the chain.

QPDFOutputBucket

In accordance with an example embodiment, a QPDFOutputBucket object encapsulates inserting of results to output buffer. The inserting itself contains mapping of coordinates form internal (expanded) coordinates to asked ones. Parameters can include:

outputBucket—pointer to buffer where result should be stored. Passed to the OutputBucket during the initialization.

statuses Buffer—pointer to buffer for cell statuses. Passed to the OutputBucket during the initialization in case cell statuses are asked explicitly in the query.

QPDFBaseUnit

In accordance with an example embodiment, a QPDFBaseUnit is the base class with abstract interface for all objects that manipulate (change) the data. The interface is streamed: the process is initiated by call to getNext function of the Unit.

In accordance with an example embodiment, a QPDFBaseUnit is the base class for Dynamic Flow units such as Aggregator and Calculator. All units in the flow can be organized in a linked list, where each unit is connected to a previous unit. The previous unit's getNext( ) interface can be used, which can be implemented in derived classes according to their types.

QPDFAggregator

In accordance with an example embodiment, an aggregator unit will perform bottom-up aggregation using cells combinations acquired from dimensions subhierarchies.

In accordance with an example embodiment, if an environment uses a hierarchy like a→c, b→c, then cells with a,b coordinates will be replaced by 'c' in the cell key and pushed to aggregation buffer. This class is responsible to aggregating data according to given sub-hierarchy. In order to keep its functionality as simple as possible, the sub-hierarchy can be built during initialization process.

In accordance with an example embodiment, this sub-hierarchy can be defined as multi-map from input stored coordinates to relevant dynamic coordinates. The algorithm or process used by the system for the aggregation can be as following: Take next cell; For each dimension find all target coordinates for aggregation; For each combination from Cartesian multiplication, update dynamic coordinates in cell key and push cell to aggregation buffer.

QPDFCalculator

In accordance with an example embodiment, a QPDFCalculator class will perform formula calculations for all asked dynamic members. ASO and BSO dynamic calculations can be processed by this object and merged to provide single interface for both types of formulas. The ASO query flow can be taken as the base flow and will just refactored to fit the new query processing scheme and data structures.

QPDFReorder

In accordance with an example embodiment, this unit will be required in case of dimension order change required between calculation units. For example, Calculator1 has dimension order "dim1,dim3,dim5" and Calculator2—"dim3,dim5,dim1"; the Reorder unit will perform intermediate data reordering to provide data in expected order to next calculation unit.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for use of a streaming mode dynamic flow in a multidimensional database environment, comprising:
   a computer, including a processor;
   a multidimensional database;
   a storage container; and
   a data buffer comprising a plurality of buckets;
   wherein the system executes a dynamic flow process that operates to:
      receiving an input query from a requestor for processing against the multidimensional database;
      expanding the input query to determine calculated data;
      based upon the expanded input query, defining a plurality of calculation units, and determining an order of calculation;
      building an executable flow comprising the defined calculation units connected in an order based on the determined order of calculation;
      executing the executable flow comprising the defined calculation units connected in an order based on the determined order of calculation wherein each defined calculation unit executes and stores each calculated dynamic cell, and then returns all calculated dynamic cells to an output bucket; and
      returning a result of the executable flow.

2. The system of claim 1,
   wherein the storage container provides an interface for reading data from the multidimensional database and providing data for aggregation and calculation by the dynamic flow.

3. The system of claim 2,
wherein in executing the executable flow, each of the plurality of calculation units are placed, respectively, into a separate bucket of the plurality of buckets.

4. The system of claim 3, wherein returning the result of the executable flow comprises:
storing the result in the multidimensional database.

5. The system of claim 3, wherein returning the result of the executable flow comprises:
providing the result to the requestor via a streaming interface.

6. The system of claim 1, wherein:
each calculation unit executes and stores each cell without temporary storage.

7. The system of claim 1, further comprising:
a streaming interface for providing the result of the executable flow to the requestor.

8. A method for use of a streaming mode dynamic flow in a multidimensional database environment, comprising:
providing, at a computer including a processor:
a multidimensional database,
a storage container, and
a data buffer comprising a plurality of buckets; and
executing a dynamic flow process, comprising steps of:
receiving an input query from a requestor for processing against the multidimensional database;
expanding the input query to determine calculated data;
based upon the expanded input query, defining a plurality of calculation units, and determining an order of calculation;
building an executable flow comprising the defined calculation units connected in an order based on the determined order of calculation;
executing the executable flow comprising the defined calculation units connected in an order based on the determined order of calculation wherein each defined calculation unit executes and stores each calculated dynamic cell, and then returns all calculated dynamic cells to an output bucket; and
returning a result of the executable flow.

9. The method of claim 8,
wherein the storage container provides an interface for reading data from the multidimensional database and providing data for aggregation and calculation by the dynamic flow.

10. The method of claim 9,
wherein in executing the executable flow, each of the plurality of calculation units are placed, respectively, into a separate bucket of the plurality of buckets.

11. The method of claim 10, wherein returning the result of the executable flow comprises:
storing the result in the multidimensional database.

12. The method of claim 10, wherein returning the result of the executable flow comprises:
providing the result to the requestor via a streaming interface.

13. The method of claim 8,
wherein each defined calculation unit executes and stores each calculated dynamic cell without temporary storage.

14. The method of claim 8, further comprising:
providing a streaming interface for the result of the executable flow.

15. A non-transitory computer readable storage medium, including instructions stored thereon for use of a streaming mode dynamic flow in a multidimensional database environment, which when read and executed by one or more computers cause the one or more computers to perform steps comprising:
providing, at a computer including a processor:
a multidimensional database,
a storage container, and
a data buffer comprising a plurality of buckets; and
executing a dynamic flow process, comprising steps of:
receiving an input query from a requestor for processing against the multidimensional database;
expanding the input query to determine calculated data;
based upon the expanded input query, defining a plurality of calculation units, and determining an order of calculation;
building an executable flow comprising the defined calculation units connected in an order based on the determined order of calculation;
executing the executable flow comprising the defined calculation units connected in an order based on the determined order of calculation wherein each defined calculation unit executes and stores each calculated dynamic cell, and then returns all calculated dynamic cells to an output bucket; and returning a result of the executable flow.

16. The non-transitory computer readable storage medium of claim 15,
wherein the storage container provides an interface for reading data from the multidimensional database and providing data for aggregation and calculation by the dynamic flow.

17. The non-transitory computer readable storage medium of claim 16,
wherein in executing the executable flow, each of the plurality of calculation units are placed, respectively, into a separate bucket of the plurality of buckets.

18. The non-transitory computer readable storage medium of claim 17, wherein returning the result of the executable flow comprises:
storing the result in the multidimensional database.

19. The non-transitory computer readable storage medium of claim 17, wherein returning the result of the executable flow comprises:
providing the result to the requestor using a streaming interface.

20. The non-transitory computer readable storage medium of claim 15, wherein;
each calculation unit executes and stores each cell without temporary storage.

* * * * *